(No Model.) 2 Sheets—Sheet 1.

R. C. KOERBER.

MACHINE FOR CLEANING, POLISHING, AND ASSORTING NUTS.

No. 247,066. Patented Sept. 13, 1881.

WITNESSES:
Chas. Nida.
C. Sedgwick

INVENTOR:
R. C. Koerber
BY Munn & Co.
ATTORNEYS.

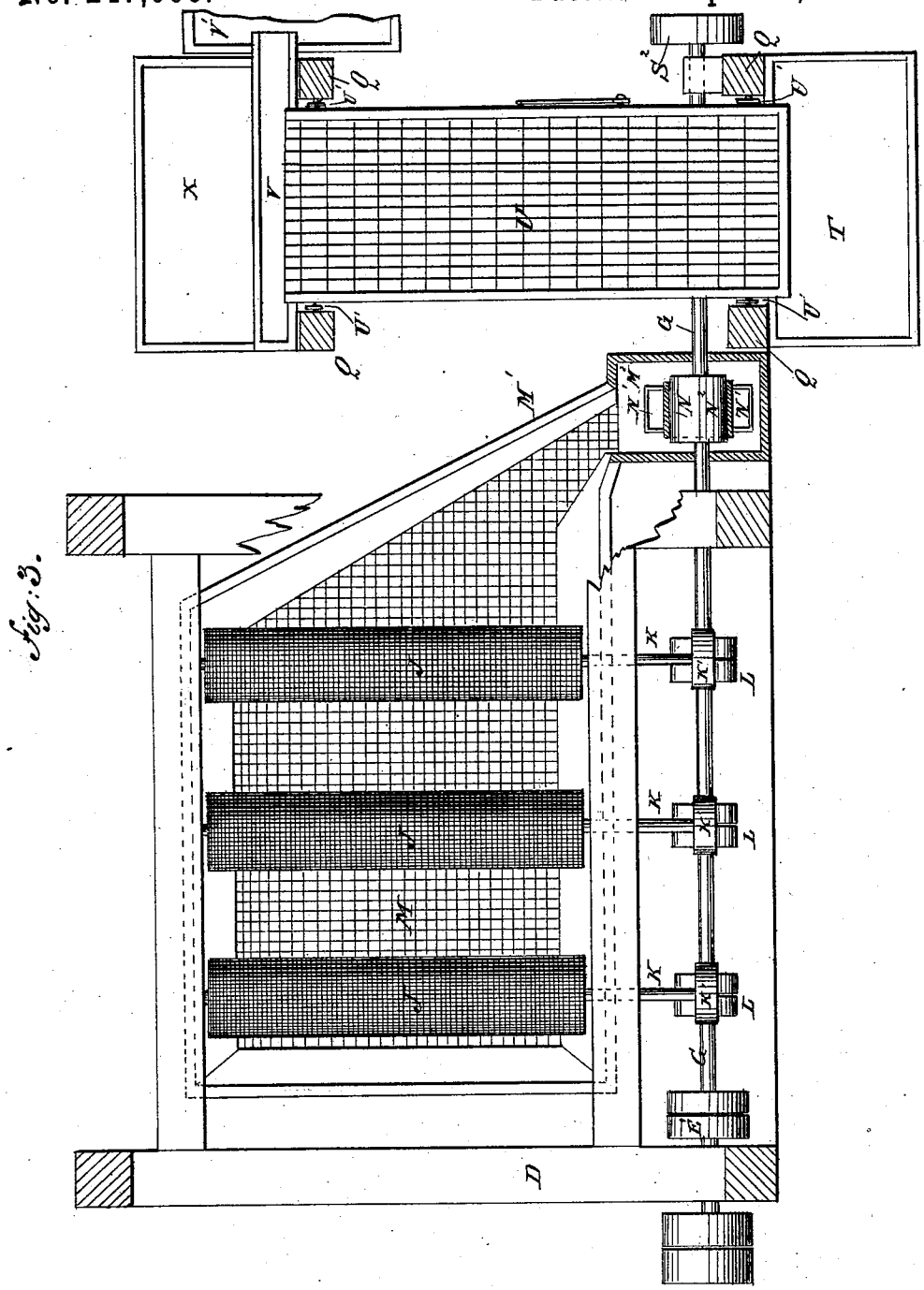

UNITED STATES PATENT OFFICE.

RUDOLPH C. KOERBER, OF AUSTIN, TEXAS.

MACHINE FOR CLEANING, POLISHING, AND ASSORTING NUTS.

SPECIFICATION forming part of Letters Patent No. 247,066, dated September 13, 1881.

Application filed April 30, 1881. (No model.)

*To all whom it may concern:*

Be it known that I, RUDOLPH C. KOERBER, of Austin, county of Travis, and State of Texas, have invented useful Improvements in Machines for Cleaning, Polishing, and Assorting Nuts, of which the following is a specification.

The invention consists in combining and arranging certain instrumentalities, as hereinafter described.

Figure 1:
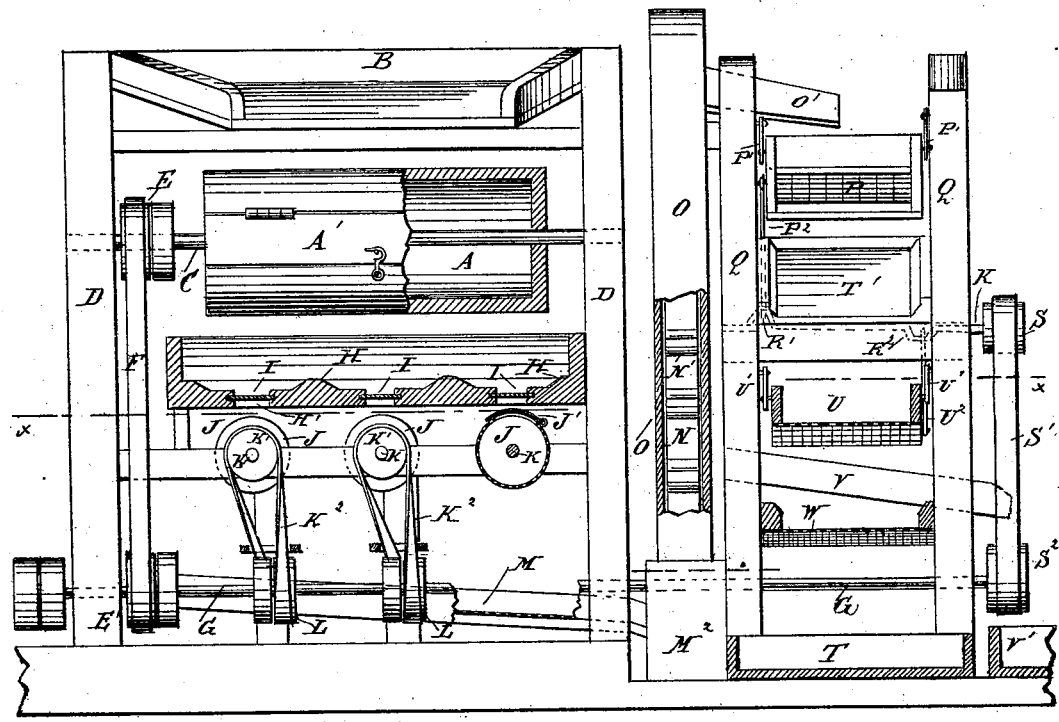
Figure 2:
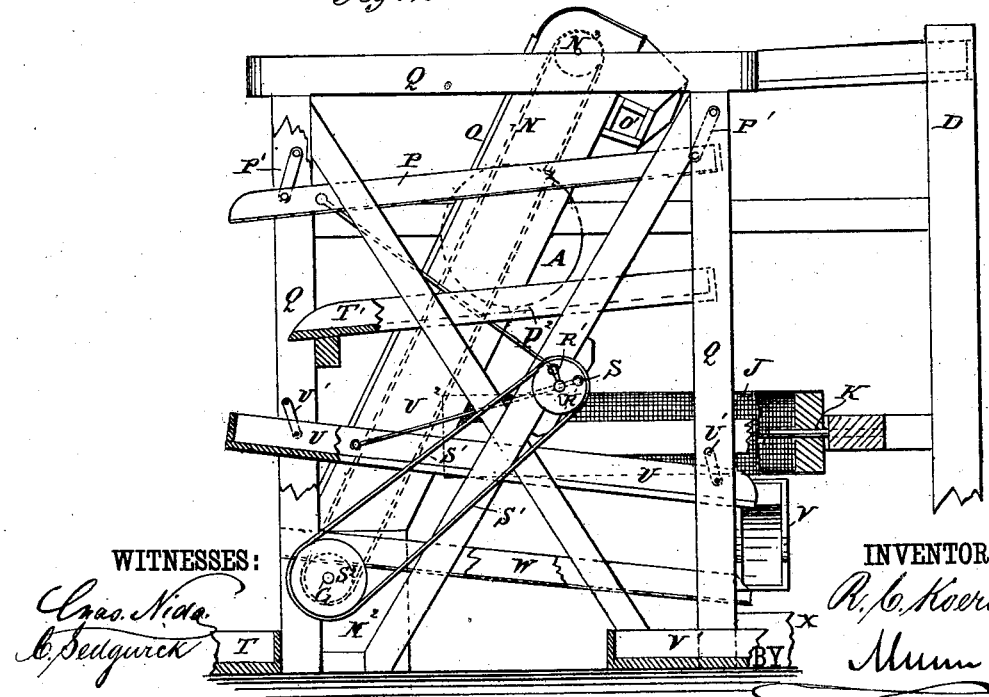

In the accompanying drawings, Figure 1 is a front elevation of my improved machine for cleaning, polishing, and assorting nuts, parts being shown in section. Fig. 2 is an end elevation of the same, parts being shown in section. Fig. 3 is a plan view of the same on the line $x\,x$, Fig. 1.

A cylinder, A, of wood or metal is provided with a hinged door, A', and is mounted on a shaft, C, which is journaled in a frame, D, and is provided with a belt-pulley, E, around which a belt, F, passes to a pulley, E', on the main driving-shaft G, which is rotated by means of any suitable motive power. A hopper, H, provided with a series of transverse openings, H', which can be closed by slides I, is arranged below the cylinder A, and below each of these openings H' a cylinder, J, of wire-netting or of perforated metal, and provided with a hinged door, J', is arranged, these cylinders being mounted on suitably-journaled shafts K, provided with driving-pulleys K', from which belts $K^2$ pass to pulleys L on the main driving-shaft G.

A wire-netting sieve or perforated floor, M, is arranged below the cylinders J, and this floor is inclined to one side and provided with an end plate, M', terminating in a receiving-box, $M^2$, which is lower than the perforated floor. A belt, N, or two or more chains, to the outer surfaces of which elevator-buckets N' are fastened, passes around a pulley, $N^2$, in the box $M^2$, and on the main driving-shaft and around a pulley, $N^3$, at the top of the frame of the machine. This elevator-belt is surrounded by a casing, O, of wood or metal, and a spout or duct, O', at the upper end of this casing O, projects over a sieve, P, of wire-cloth or perforated metal with large meshes or apertures, suspended from the frame Q by links P', and slightly inclined from the rear to the front of the frame Q—that is, from that end of the frame Q where the upper end of the elevator-casing is toward the opposite end of the frame. The frame of this sieve P is connected by a rod, $P^2$, with a crank, R', of a shaft, R, journaled in the frame Q, and provided with a pulley, S, around which a belt, S', passes from a pulley, $S^2$, on the main driving-shaft G. A box, T, is arranged below the outer end of the sieve P. An inclined platform, T', parallel with the sieve P, is arranged below the same; but the end of this platform is a short distance back of the end of the sieve P. A sieve, U, with smaller meshes or perforations than the sieve P, is suspended below the platform T' from the frame Q by means of links U'. This sieve U is inclined in the reverse direction of the inclination of the sieve P, and is connected with a crank, $R^2$, of the shaft R by means of a rod, $U^2$. An inclined chute, V, is arranged below the lower end of the sieve U and leads to a box, V'. A sieve or perforated platform, W, the meshes or perforations of which are smaller than those of the sieve U, is arranged below and parallel with the same, and a box, X, is arranged below the lower end of the sieve W. An inclined chute or platform, B, with an end opening of about the same length as the hinged door A' of the cylinder A, is arranged above this cylinder.

The operation is as follows: The nuts to be cleaned—such as pecan-nuts, walnuts, &c.—are placed on the chute or platform B, and from there drop into the cylinder A, the door A' of which is opened. Then a quantity of gravel, broken stones, or pulverized glass, &c., is placed into the cylinder with the nuts, and then the door A' of the cylinder is closed and held in place by a suitable latch. The cylinder A is then rotated, and by this operation the shells or particles of shells are broken from the nuts, which are thus cleaned. After a certain time the door A' is opened and the nuts drop into the hopper H, and from there into the cylinders J, the doors J' of which have been opened. These doors are then closed and these cylinders are rotated, whereby the nuts are polished, the sand, pebbles, or pulverized glass dropping through the meshes of the cylinders upon the sieve M and through the same. After a certain time the doors J' are opened, and the nuts drop upon the sieve M, down which they slide into the box M², the remaining smut, leaves, twigs, pebbles, &c., dropping through the meshes or perforations of this sieve M. From the box M² the nuts are raised by the elevator, and, passing through the chute O', they drop upon the vibrating sieve P. The nuts that are larger than the meshes slide down the sieve and drop into the box T. The smaller nuts drop upon the platform T', and from the end of the same upon the vibrating sieve U, which has smaller meshes than the sieve P, and the nuts larger than the meshes of the sieve U slide down this sieve and through the chute V and into the box V'. The smallest nuts drop through the meshes of the sieve U, upon the sieve W, and slide down this sieve into the box X, the remaining sand, smut, &c., dropping through the meshes of the sieve W. The nuts are thus cleaned, polished, and assorted according to size. The assortment according to size can be carried on to a greater extent by providing more vibrating sieves, &c. While the nuts are being assorted, another quantity is being cleaned and polished.

Having thus fully described my invention, I claim as new and desire to secure by Letters Patent—

1. The combination, with the nut-cleaning cylinder A, having the longitudinal door A', and transversely-arranged wire cylinders J, having doors J', of the intermediate hopper, H, arranged lengthwise of the cylinder A, as well as under it, and having apertures H' over the doors J' of the wire cylinders, as and for the purpose specified.

2. The combination, with a series of sieves successively increasing in mesh, of a perforated floor, M, an end plate, M', terminating in eccentric M², an elevator, and a delivery-spout, as and for the purpose described.

RUDOLPH C. KOERBER.

Witnesses:
JOHN C. LEWIS,
JOHN F. BENNETT.